(12) United States Patent
Kramer

(10) Patent No.: US 10,048,947 B2
(45) Date of Patent: Aug. 14, 2018

(54) METHOD FOR CONNECTING OBJECTS IN A SOFTWARE APPLICATION

(71) Applicant: OMS Software GmbH, Munich (DE)

(72) Inventor: Christian Kramer, Munich (DE)

(73) Assignee: OMS SOFTWARE GMBH, Munich (DE)

( * ) Notice: Subject to any disclaimer, the term of this patent is extended or adjusted under 35 U.S.C. 154(b) by 258 days.

(21) Appl. No.: 15/010,976

(22) Filed: Jan. 29, 2016

(65) Prior Publication Data

US 2016/0147508 A1 May 26, 2016

Related U.S. Application Data

(63) Continuation of application No. PCT/EP2014/066534, filed on Jul. 31, 2014.

(30) Foreign Application Priority Data

Aug. 1, 2013 (DE) .................. 10 2013 108 309

(51) Int. Cl.
*G06F 9/44* (2018.01)
*G06F 8/36* (2018.01)
*G06F 8/61* (2018.01)

(52) U.S. Cl.
CPC ............... *G06F 8/36* (2013.01); *G06F 8/63* (2013.01); *G06F 9/44* (2013.01)

(58) Field of Classification Search
CPC ................ G06F 8/63; G06F 9/44; G06F 8/36
See application file for complete search history.

(56) References Cited

U.S. PATENT DOCUMENTS 5,659,751 A * 8/1997 Heninger .............. G06F 9/4428
717/163
6,163,813 A 12/2000 Jenney
(Continued)

OTHER PUBLICATIONS

Michael Felderer et al., Model-driven System Testing of Service Oriented System, 2009, retrieved online on Apr. 19, 2018, pp. 1-8. Retrieved from the Internet: <URL: http://www.dbs.ifi.lmu.de/~fiedler/publication/FZFCB09.pdf>. (Year: 2009).*
(Continued)

*Primary Examiner* — Hanh T. Bui
(74) *Attorney, Agent, or Firm* — Myers Wolin, LLC

(57) ABSTRACT

A computer-implemented method and a correspondingly adapted computer program product or software application for connecting business objects in a software application (SA), wherein the software application comprises a connector (K), wherein the connector comprises a code identifying an abstract business object class (ABO1 to ABOn), the software application identifies the abstract business object class specified in the connector at runtime in a hierarchy of abstract business object classes, and the software application, at runtime, proceeding from the identified abstract business object class, identifies at least one concrete business object class (KBO1 to KBOn), directly or indirectly derived therefrom, and establishes a connection (V) in at least one instance (I1 to In) of the at least one identified concrete business object class, via which connection the software application accesses attributes and methods of the instance of the concrete business object class.

14 Claims, 2 Drawing Sheets

(56) References Cited

U.S. PATENT DOCUMENTS

| | | | | |
|---|---|---|---|---|
| 2003/0135850 A1* | 7/2003 | Miloushev | ................ | G06F 8/36 |
| | | | | 717/165 |
| 2003/0226136 A1* | 12/2003 | Calahan | .............. | G06F 9/44521 |
| | | | | 717/162 |
| 2007/0157155 A1* | 7/2007 | Peters | ....................... | G06F 8/10 |
| | | | | 717/100 |

OTHER PUBLICATIONS

Floran Untergerger and Robert Singer, Actor Based Business Process Automation via Intelligent Business Objects, ACM, 2017, retrieved online on Apr. 19, 2018, pp. 1-5. Retrieved from the Internet: <URL: http://delivery.acm.org/10.1145/3050000/3040569/a1-Unterberger.pdf?>. (Year: 2017).*

English Translation of the German Search Report issued for corresponding German Patent Application No. 10 2013 108 309.9 dated Apr. 9, 2014.

International Search Report, dated Sep. 19, 2014 for corresponding International Application PCT/EP2014/066534.

Frantisek Plasil, Michael Stal, "An Architectural View of Distributed Objects and Components in CORBA, Java RMI, and COM/DCOM" Software Concepts and Tools, vol. 9, No. 1, Springer 1998, pp. 1-21, Internet Citation Jun. 1998, URL: www.informatik.uni-trier.de/~ley/db/journals/stp/stp19.html.

* cited by examiner

METHOD FOR CONNECTING OBJECTS IN A SOFTWARE APPLICATION

CROSS-REFERENCE TO RELATED APPLICATIONS

The present application is a continuation of International Application No. PCT/EP2014/066534 filed on Jul. 31, 2014, which claims priority to German Patent Application No. DE 10 2013 108 309.9, filed on Aug. 1, 2013, the contents of each of which are incorporated herein by reference.

FIELD OF THE INVENTION

The invention relates to a method for connecting objects, in particular, business objects, in a software application, as well as to a computer program product adapted correspondingly.

BACKGROUND

So-called monolithic software systems are known, according to which the functional elements often are combined in a single software application inseparably. The administration and processing of the associated data is also carried out by the software application. An example for such a monolithic software application is an activity recording, according to which the activities can be acquired and assigned to a certain person. With respect to such an activity recording, not only activities are acquired and stored relating to a person, but rather also master data of the person is managed. Accordingly, the software application for activity recording is only able to access persons being managed in the activity recording.

As an alternative to the monolithic software applications, software applications are known, which are based on so-called client-server architecture, or which are configured as distributed software systems in general. Hereby, for example, the activity recording may be realized by two software components, wherein activities are acquired in a first component and may be assigned to a person, and wherein the persons are acquired and managed in a second component. The component for acquisition of activities may access the component for administration of the persons via an interface. Thereby, an improved maintainability of the software components or the data is achieved.

This procedure, however, has the disadvantage that already at the point of development of the component for activity recording, it has to be known which concrete component for managing the person is or is to be accessed during runtime. An exchange of the component for managing the person usually involves an adaptation of the component for acquisition of the activities, because, for example, the interfaces to the component have to be adapted to the person management in the component for activity recording, the latter not being possible during runtime, and has to be carried out in the source code of the component for activity recording.

A simple replacement of the components for the person management without adaptation of the component for activity recording, therefore, is not possible such that the component for activity recording during runtime may only access a concrete component for person management defined for activity recording.

In case a component for activity recording should nevertheless be able to have access to different components for person management, for each person component, an individual interface being adapted for this has to be implemented in the component for activity recording. Newly available components for person management may only be used, if also a corresponding interface is implemented for these new components in the component for activity recording.

SUMMARY

Therefore, the present invention is based on the object to provide solutions, according to which the disadvantages known from prior art can be avoided at least partially, and which enable to access, in a software application, a number of different software components, business objects, or further software applications without having to implement for each single software component, business object, or further software application a corresponding interface. In particular, the number of interfaces for the access to a number of different software components, business objects, or further software applications should be reduced.

This technical object is solved according to the invention by a method for connecting objects or business objects in a software application, as well as by a computer program product adapted accordingly according to the independent claims. Preferred embodiments of the invention are specified in the respective dependent claims.

Accordingly, a computer implemented method for connecting business objects in a software application is provided, wherein the software application comprises a connector, wherein the connector comprises an identifier identifying an abstract business object class, the software application determines during runtime the abstract business object class indicated in the connector within a hierarchy of abstract business object classes, and during runtime, the software application
starting from the determined abstract business object class, determines at least one concrete business object class being derived directly or indirectly therefrom, and
establishes a connection to at least one instance of the at least one determined concrete business object class, via which the software application accesses attributes and methods of the instance of the concrete business object class.

An abstract business object class is a class by which no instances are generated or no instances may be generated. A concrete business object class is a class by which instances are generated or instances may be generated.

An essential advantage of the inventive method is that the software application may access the entire hierarchy of the abstract business object classes and the concrete business object classes (because the concrete business object classes are derived directly or indirectly from the abstract business objects classes, the abstract business object classes and the concrete business object classes together also form a hierarchy), and thereby, the definitions of the abstract business object classes as well as of the concrete business object classes of the software application are known. Therefore, the software application is able to establish a connection to instances of the concrete business object classes, or is able to access instances of the concrete business object classes, because the access is effected via the methods defined and implemented in the abstract business object classes and/or in the concrete business object classes. An adaptation of the interfaces in the software application in order to be able to access different objects, thus, is omitted. Thereby, also the flexibility may be increased, and at the same time, the maintenance costs may be reduced.

In particular, thereby, it is achieved that the number of interfaces for the access to instances of the concrete business object classes is reduced substantially—preferably, only one single interface is necessary. Thereby, the technical problem is solved that for different instances, also different interfaces have to be implemented.

Moreover, it is advantageous that the instance of the concrete business object class may already be present, e.g., in serialized form, prior to the access via the connection to the instance, the latter only has to be de-serialized, which may be accomplished, for example, by means of a constructor of the concrete business object class.

According to an embodiment of the invention, the connector may be added to the source code of the software application. If several determined concrete business object classes are present, the software application may select a concrete business object class and may establish the connection to at least one instance of the selected concrete business object class.

The selection of the concrete business object class by the software application may be effected in response to a user input, according to which a user of the software application selects from the several determined concrete business object classes a concrete business object class.

It is preferred, if the software application receives via the connection, a unique identifier of an instance of the concrete business object class and stores the latter. Thereby, it is guaranteed that the software application is able to access the same instance again at a later point of time or is able to establish a connection to the same instance.

The software application may, in addition to the unique identifier of the instance of the concrete business object class, receive and/or store a unique identifier of the concrete business object class.

The unique identifier of the concrete business object class may be set during instantiation of the instance automatically, preferably, by a constructor of the concrete business object class.

It is preferred, if the connection to the at least one instance of the at least one determined concrete business object class may be generated via a communications network (remote connection). This is preferable in such a case, if the software application is being executed on another computer system being different from the computer system on which the instance of the determined concrete business object class is stored.

It is preferred, if the concrete business object class is connected via an adapter to at least one external software system, in which characteristics of the concrete business object class are stored. The characteristics do not have to be identical to the instances of the concrete business object class. The instances of the concrete business object class may have another data structure than the corresponding characteristics in the external software system.

According to an embodiment of the invention, each instance of a concrete business object class is assigned to exactly one characteristic in the external software system.

According to an embodiment of the invention, at least one instance of the at least one determined concrete business object class may be connected via an adapter to at least one external software system, in which characteristics of the at least one instance are stored. The instance of the determined concrete business object class does not have to be identical to the associated characteristic.

The instances of the concrete business object class may have another data structure than the characteristics connected via the adapter to the respective instances in the external software system.

It is preferred, if the adapter receives method calls of the concrete business object class or the instances, converts these into instructions executable by the external software system, and transfers the executable instructions to the external software system.

Further, it is preferred, if the adapter receives data from the external software system and transfers these to one or more instances of the concrete business object class. Thereby, a characteristic in the external software system may be transferred into an instance of the respective concrete business object class. For this, the adapter may provide corresponding mapping rules and/or transformation rules. Corresponding mapping rules and/or transformation rules may also be provided or used, if an instance of a concrete business object class is to be stored in a corresponding characteristic in the external software system.

The hierarchy of the abstract and concrete business object classes may be stored in a configuration file, which may be accessed during runtime by the software application.

The software application may access, via methods of the determined abstract business object class or abstract business object classes derived from these, the instance or instances of the concrete business object class.

The software application may comprise during runtime an instance of a concrete business object class. The instance of the concrete business object class may be part of a further software application.

The software application and the instance of the concrete business object class and/or the software application and the further software application preferably are executed during runtime in a shared runtime environment.

Further, a computer program product is provided, which may be loaded into the memory of a data processing means and may be executed on the latter, and which comprises program sections being adapted to execute a method according to the invention.

BRIEF DESCRIPTION OF THE FIGURES

Further details and features of the invention as well as concrete, in particular, preferred embodiments of the invention can be derived from the following description in connection with the drawing, in which.

DETAILED DESCRIPTION OF THE INVENTION

Figure 1:
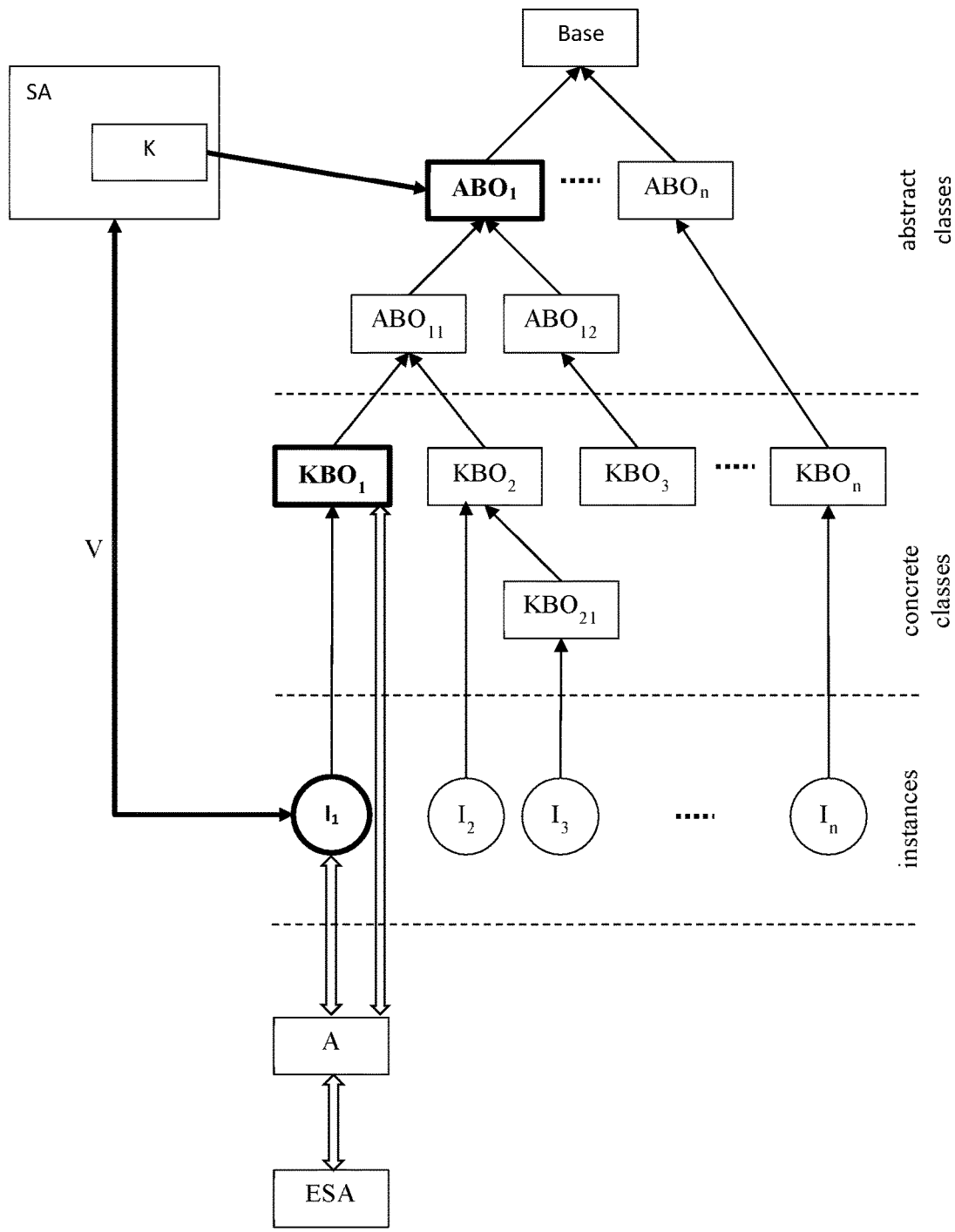
FIG. 1 shows a software architecture according to the invention for illustrating the method for connecting objects or business objects according to the invention.

FIG. 1 shows a software architecture, which is adapted for a method for connecting objects or business objects in a software application.

A software application SA during runtime is supposed to have access to a certain business object being implemented outside of the software application SA. The software application SA is also being referred to as so called Micro-APP. The business object, which is to be accessed by the software application SA during runtime may also be provided by a software application or Micro-APP or may be implemented in a software application. The business object which is to be accessed by the software application SA during runtime belongs to a certain class of business objects, for example, persons or documents.

According to the invention, it does not have to be specified already during the time of development of the software application SA which concrete business object the software application has to access during runtime. Rather, according to the invention it is sufficient, if at the time of development, it is specified, which class of business objects is to be accessed by the software application during runtime. Thereby, it is avoided that for different business objects in the software application SA corresponding interfaces have to be implemented respectively. The concrete business object is then determined or selected during runtime of the software application, preferably, by the software application.

In order to accomplish this, according to the invention, a hierarchy of business objects or an arrangement of business objects in a hierarchical tree structure is provided.

The tree structure comprises an abstract base-business-object-class base, from which one or more abstract business object classes may be derived. From these derived abstract business object classes $ABO_1$ to $ABO_n$, a number of abstract business object classes $ABO_{11}$ to $ABO_{n1}$ may, in turn, be derived respectively. "Derived" means that a derived abstract business object class inherits attributes and methods of the parent class. The depth of the tree structure, in which the abstract business object classes are organized, may be arbitrary.

A number of concrete business object classes KBO may be respectively derived from the abstract business object classes ABO. From each concrete business object class KBO, a number of concrete business object classes KBO may, in turn, be derived, wherein a concrete business object class inherits the methods and attributes of the higher concrete business object class.

One or more instances may be assigned to each concrete business object class KBO. For example, an instance $I_1$ may be assigned to the concrete business object class $KBO_1$, wherein the concrete business object class $KBO_1$ is derived from the abstract business object class $ABO_{11}$, which in turn is derived from the abstract business object class $ABO_1$. By means of the hierarchical arrangement of the abstract business object classes within a tree structure, the lower concrete business object classes are being structured, wherein the abstract business object classes ABO may implement methods, which may be used or overwritten by the concrete business object class KBO derived directly or indirectly.

With respect to the example shown in FIG. 1, the software application SA is supposed to have access to a certain class of business objects during runtime, wherein the concrete business object class does not have to be known at the time of development.

For this, a connector K is provided in the software application SA, which comprises an identifier identifying the abstract business object class. In the example shown in FIG. 1, the identifier of the connector K identifies the abstract business object class $ABO_1$.

During runtime, the software application SA determines the abstract business object class $ABO_1$ indicated in the connector K within the tree structure comprising the abstract business object classes. Starting from the determined abstract business object class $ABO_1$, the software application SA determines during runtime at least one concrete business object class being derived therefrom directly or indirectly. In the example according to FIG. 1, the software application SA determines the concrete business object classes $KBO_1$, $KBO_2$, $KBO_3$, and $KBO_{21}$ during runtime, because those four concrete business object classes are derived directly or indirectly from the abstract business object class $KBO_1$.

After the concrete business object classes have been determined, the software application SA may establish a connection to at least one concrete business object class or to at least one instance of the determined concrete business object classes.

In case several concrete business object classes have been determined, which are derived directly or indirectly from the abstract business object class, the software application SA may select, from the determined concrete business object classes, a concrete business object class. In the example shown in FIG. 1, the software application SA has selected the concrete business object class $KBO_1$ such that the software application SA during runtime may establish a connection V to an instance $I_1$ of the concrete business object class $KBO_1$. The selection of a concrete business object class from several concrete business object classes may be carried out by the software application SA itself according to certain selection criteria.

According to an embodiment of the invention, the selection of a concrete business object class may result in response to a user input, according to which a user of the software application SA during runtime selects a concrete business object class from the several determined concrete business object classes. For this, the software application SA may provide the user with a selection list comprising the determined concrete business object classes for selection of a certain concrete business object class.

According to the invention, the software application SA may not only establish a connection V to a single selected concrete business object class, but rather also connections to instances of various concrete business object classes. In this case, no selection of a special concrete business object class by the software application SA or by a user has to be made. Thereby, for example, it is possible that the software application SA provides a list of instances of various concrete business object classes to the user for selection of an instance without an individual interface having to be implemented in the software application for each different concrete business object class for this.

In the example shown in FIG. 1, for example, the abstract business object class $ABO_{11}$ may implement a method, by means of which the instances of the concrete business object classes $KBO_1$, $KBO_2$, and $KBO_{21}$ derived directly or indirectly from the abstract business object class $ABO_{11}$ may be determined and may be displayed in the software application SA. However, such a method may also be implemented or overwritten by the concrete business object classes such that, for example, the concrete business object class $KBO_1$ determines the list of all instances of the concrete business object class $KBO_1$, and, for example, the concrete business object class $KBO_2$ determines a list of all instances of the concrete business object class $KBO_2$ and the concrete business object class $KBO_{21}$.

Now, only a connector K has to be defined in this manner in the software application SA referencing an abstract business object class in order to establish a connection to instances of the concrete business object classes derived from this abstract business object class, or to access these instances.

Because in the derivation hierarchy (class hierarchy) of the abstract business object classes or concrete business object classes, the corresponding methods are implemented for access to the respective instances, no specific interfaces have to be implemented in the software application SA for the access to instances. Moreover, the software application or a user of the software application has to decide during runtime, which instances may be accessed or are allowed to be accessed of which concrete business object class or concrete business object classes by the software application.

The lower the abstract business object class is located in the hierarchy of the tree structure, the more specific the access to the corresponding instances will be. I.e., if the connector K comprises a reference to the abstract business object class $ABO_{11}$, the software application may access instances of the concrete business object classes $KBO_1$, $KBO_2$, and $KBO_{21}$, whereas with respect to a reference to the abstract business object class $ABO_1$, moreover, it is possible to access the instances of the concrete business object class $KBO_3$.

Further, additional concrete business object classes may be added to the hierarchy subsequently, whereby the software application SA, without any further adaptation, may also access the instances of these additional concrete business object classes. For this, it is only required for the additional concrete business object classes to be derivable respectively from an abstract business object class. For example, an additional concrete business object class $KBO_4$ could be derived from the abstract business object class $ABO_{12}$ such that with respect to the example shown in FIG. 1, the software application SA also has access to the instances of the new concrete business object class $KBO_4$ automatically via the abstract business object class $ABO_1$, without any adaptations/extensions having to be carried out in the software application.

Via the connection V, the software application SA, for example, is allowed to have access to a unique identifier of a selected instance, which may be stored in the software application preferably in combination with a class identification.

According to an embodiment of the invention, an instance of a concrete business object class may be connected to an external software system ES via an adapter A. In the external software system ES, the real characteristics of a concrete business object class are stored and managed. The external software system ES may be physically separated from the software system, on which the software application SA is being executed. The software system, on which the software application is being executed, may be coupled to the external software system via a communications interface.

The adapter A is adapted to receive method calls of the respective concrete business object class or instance, and to transfer the received method calls to the external software system ES, or to transform the received method calls into instructions executable by the external software system. For example, the abstract business object class $ABO_1$ may define or implement a method "getList( )", by means of which a certain number of instances of the concrete business object class $KBO_1$ are to be determined. The software application SA may call this method of the instance $I_1$, wherein the adapter A transforms this method into a corresponding method of the external software system ES, and executes it. As a result of the execution, the external software system ES transmits a number of data objects to the adapter A, which is/are transformed into a list of instances $I_1$ by the adapter A, which is referenced by the instance $I_1$. Thus, only adapters have to be provided, via which the instances of the concrete business objects may access external software systems. For this, the software application SA does not have to be adapted.

According to an embodiment of the invention, a number of so-called Micro-APPs may be provided, wherein each Micro-APP is adapted for the administration of different business objects. For example, persons (e.g., inventors) may be managed in a first Micro-APP, documents (e.g., patent applications) in a second Micro-APP, and remunerations (e.g., inventor remunerations) in a third Micro-APP. The corresponding business objects are defined in a hierarchy of abstract and concrete business object classes.

In the Micro-APP "remunerations", according to the invention, now only a connector has to be provided comprising an identifier for the business object class "persons", and an identifier for the business object class "documents". On the basis of these identifiers, the Micro-APP "remunerations" may establish connections to instances of the business object classes "documents" and "persons" without interfaces to the other two Micro-APPs having to be implemented. Thereby, the Micro-APP "remunerations" is connected to the other two Micro-APPs, or may connect itself to the other two Micro-APPs automatically.

Figure 2:
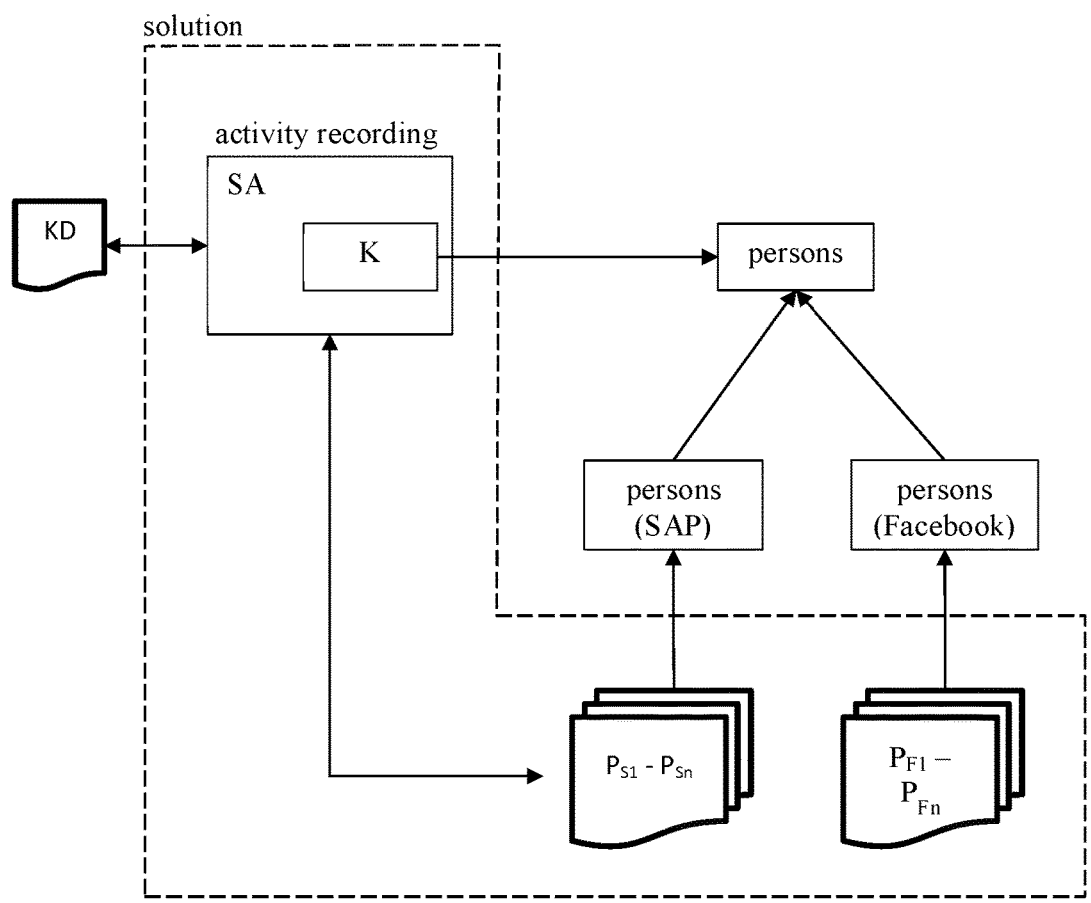
FIG. 2 shows a concrete example by means of which the method according to the invention is described.

FIG. 2 shows a concrete example of a software application, which is provided with access to instances of concrete business object classes according to the method described above via a connector.

According to the example described in FIG. 2, with respect to the software application SA, a so-called activity recording is concerned, according to which activities are acquired and assigned to a certain person. The acquisition of the activities itself, here, is implemented in the software application SA.

In order to be able to assign the determined activities to a concrete person, the software application, for example, has to offer a selection list, from which a user may select a certain person, to which the activity is to be assigned. In order to be able to select persons originating from different applications, at first, an abstract business object class "persons" is defined, from which to further abstract business object classes "persons (SAP)" and "persons (Facebook)" are derived. Then, in the software application SA, a connector K is defined comprising the identifier of the abstract business object class "persons", or referencing the abstract business object class "persons".

By the connector referencing the abstract business object class "persons", the software application SA may offer a list of all persons for selection representing instances of the concrete business object classes, which may be derived directly or indirectly from the abstract business object classes "persons (SAP)" and "persons (Facebook)". In the example shown in FIG. 2, for providing a better overview, only the instances of these concrete business object classes are shown. However, the respective concrete business object classes are not shown. With respect to the instances $PS_1$ to $PS_n$, person objects from an SAP system are concerned. With respect to the instances $PF_1$ to $PF_n$, persons from the social network platform Facebook are concerned. Via the adapters not shown in FIG. 2, the respective instances may access the SAP system or Facebook.

During runtime of the software application SA, the latter determines the abstract business object classes derived from the abstract business object class "persons", as well as the concrete business object classes derived from these. The software application SA then may establish a connection to the concrete business object classes or to the instances of the concrete business object classes, and may access the instances of the concrete business object classes without having to implement a specific interface for this. The methods required for the access are defined or implemented in the abstract business object classes.

The definition of the tree structure of the abstract business object classes and of the concrete business object classes may be derived by the software application SA from a configuration file KD, to which the activity recording has access during runtime.

According to an embodiment of the invention, the activity recording and the concrete business object classes or the instances of the concrete business object classes are executed in a shared runtime environment, in order to ensure that a connection to the instances may be established. The shared runtime environment is indicated in FIG. 2 by the area "Solution".

According to an embodiment of the invention, an adapter A may be omitted, for example, if the instances of the concrete business object class are "real" instances, which may be accessed by the activity recording.

The method may be executed by a processor or a microprocessor, wherein the processor or microprocessor has access to a definition of the hierarchy of abstract business object classes. This definition may be stored in an external file or in a database system. The processor or microprocessor determines the abstract business object class, the concrete business object class derived therefrom, and establishes a connection to an instance of the concrete business object class. As far as the instance is stored on another system, e.g., on another server, the processor or microprocessor is adapted to establish a communications connection to the other system, and to establish the connection to the instance of the concrete business object class via this communications connection.

REFERENCE NUMERALS

A adapter
$ABO_1$ to $ABO_n$ abstract business object classes
Base abstract base business object classes
ES external software application
$I_1$ to $I_n$ instances of one or more concrete business object classes
K connector
KD configuration file
$KBO_1$ to $KBO_n$ concrete business object classes
SA software application, e.g., a so-called Micro-APP
V connection

The invention claimed is:

1. A computer implemented method for connecting business objects in a software application (SA), wherein
the software application comprises a connector (K), wherein the connector comprises an identifier identifying an abstract business object class ($ABO_1$ to $ABO_n$),
the software application, during runtime, determines the abstract business object class indicated by the connector in a hierarchy of abstract business object classes, and
the software application is executed by a processor, and during runtime
starting from the determined abstract business object class, determines at least one concrete business object class ($KBO_1$ to $KBO_n$) derived therefrom directly or indirectly, and
establishes a connection (V) to at least one instance ($I_1$ to $I_n$) of the at least one determined concrete business object class, via which the software application accesses attributes and methods of the at least one instance of the at least one determined concrete business object class,
wherein the at least one determined concrete business object class ($KBO_1$ to $KBO_n$) is connected to at least one external software system (ES) via an adapter (A), in which characteristics of the concrete business object class are stored,
wherein the at least one instance ($I_1$ to $I_n$) of the at least one determined concrete business object class ($KBO_1$ to $KBO_n$) is connected to at least one external software system (ES) via an adapter (A), in which characteristics of the at least one instance are stored,
wherein the adapter (A) receives method calls of the at least one determined concrete business object class ($KBO_1$ to $KBO_n$) or the at least one instance ($I_1$ to $I_n$), transforms these method calls into instructions executable by the external software system (ES), and transmits the executable instructions to the external software system,
wherein an abstract business object class implements a method, by means of which instances of the at least one determined concrete business object class derived from this abstract business object class directly and/or indirectly may be accessed, and
wherein the method comprises determining of the instances and transmitting the determined instances to the software application.

2. The method according to claim 1, wherein the connector (K) is added to source code of the software application.

3. The method according to claim 1, wherein for several determined concrete business object classes ($KBO_1$ to $KBO_n$), the software application (SA) selects at least one determined concrete business object class, and establishes the connection (V) to at least one instance ($I_1$ to $I_n$) of the selected at least one determined concrete business object class.

4. The method according to claim 3, wherein the selection of the at least one determined concrete business object class by the software application (SA) results in response to a user input, according to which a user of the software application selects a concrete business object class from the several determined concrete business object classes ($KBO_1$ to $KBO_n$).

5. The method according to claim 1, wherein the software application (SA) receives and stores, via the connection (V), a unique identifier of an instance of the at least one determined concrete business object class ($KBO_1$ to $KBO_n$).

6. The method according to claim 5, wherein the software application (SA), in addition to the unique identifier of the instance ($I_1$ to $I_n$) of the at least one determined concrete business object class ($KBO_1$ to $KBO_n$) stores a unique identifier of the concrete business object class.

7. The method according to claim 1, wherein the connection (V) to the at least one instance ($I_1$ to $I_n$) of the at least one determined concrete business object class ($KBO_1$ to $KBO_n$) is established via a communications network.

8. The method according to claim 1, wherein the adapter receives data from the external software system (ES), and transmits it to one or more instances of the at least one determined concrete business object class.

9. The method according to claim 1, wherein the hierarchy of the abstract business object classes and the at least one determined concrete business object class are stored in a configuration file (KD), to which the software application (SA) has access during runtime.

10. The method according to claim 1, wherein the software application (SA) accesses the at least one instance ($I_1$ to $I_n$) of the at least one determined concrete business object class ($KBO_1$ to $KBO_n$) via methods of the at least one determined abstract business object class or abstract business object classes ($ABO_1$ to $ABO_n$) derived therefrom.

11. The method according to claim 1, wherein the software application (SA), during runtime, comprises an instance of the at least one determined concrete business object class, and/or wherein the instance of the at least one determined concrete business object class is part of a further software application.

12. The method according to claim 1, wherein the software application (SA) and the at least one instance of the at least one determined concrete business object class, and/or the software application (SA) and the further software application are executed in a shared runtime environment during runtime.

13. The method according to claim 1, wherein the software application establishes connections to instances of different determined concrete business object classes during runtime.

14. A computer program product, which may be loaded into the memory of a data processing means and which may be executed on the latter, and which comprises program sections being adapted to execute the method according to claim 1.

* * * * *